(12) United States Patent
Taskar (10) Patent No.: US 8,322,380 B2
(45) Date of Patent: Dec. 4, 2012

(54) UNIVERSAL FLUID FLOW ADAPTOR

(75) Inventor: Mark Taskar, San Mateo, CA (US)

(73) Assignee: Lam Research Corporation, Fremont, CA (US)

( * ) Notice: Subject to any disclaimer, the term of this patent is extended or adjusted under 35 U.S.C. 154(b) by 1001 days.

(21) Appl. No.: 12/245,671

(22) Filed: Oct. 3, 2008

(65) Prior Publication Data

US 2009/0095354 A1   Apr. 16, 2009

Related U.S. Application Data

(60) Provisional application No. 60/979,788, filed on Oct. 12, 2007.

(51) Int. Cl.
*F16K 11/20* (2006.01)
(52) U.S. Cl. ........................................ 137/884
(58) Field of Classification Search ............... 137/884
See application file for complete search history.

(56) References Cited

U.S. PATENT DOCUMENTS

| | | | | |
|---|---|---|---|---|
| 3,360,008 | A | * | 12/1967 | Childers et al. ........... 137/594 |
| 3,680,589 | A | * | 8/1972 | Jeans et al. ............... 137/884 |
| 3,756,274 | A | * | 9/1973 | Wolfgramm .............. 137/561 R |
| 3,806,088 | A | * | 4/1974 | Stoneman et al. ........... 251/367 |
| 4,183,373 | A | * | 1/1980 | Kay ....................... 137/269.5 |
| 4,848,393 | A | * | 7/1989 | West ....................... 137/312 |
| 5,282,488 | A | * | 2/1994 | Roth et al. ............... 137/15.08 |
| 6,161,876 | A | | 12/2000 | Sabathie |
| 6,615,871 | B2 | * | 9/2003 | Ohmi et al. ................ 137/884 |
| 6,729,353 | B2 | * | 5/2004 | Nguyen .................... 137/884 |
| 2004/0160056 | A1 | | 8/2004 | Albrecht et al. |

FOREIGN PATENT DOCUMENTS

| | | |
|---|---|---|
| CN | 1157032 A | 8/1997 |
| DE | 19934574 A1 | 2/2001 |
| FR | 2652404 A1 | 9/1989 |
| WO | WO 99/22165 A1 | 5/1999 |

OTHER PUBLICATIONS

Search Report dated Nov. 24, 2009 from Singapore Patent Application No. 200807434-6.
Examination Report dated Nov. 24, 2009 from Singapore Patent Application No. 200807434-6.
Office Action dated Aug. 12, 2010 from Chinese Application No. 200810167473.5.

* cited by examiner

*Primary Examiner* — John Fox
(74) *Attorney, Agent, or Firm* — Beyer Law Group LLP (57) ABSTRACT

A universal fluid flow adaptor may be formed of a single structure having a plurality of vertical conduits to receive a gas flow, the plurality of vertical conduits extending through the single structure from the top surface to the bottom surface, a plurality of horizontal conduits to receive a gas flow, the plurality of horizontal conduits extending through the first side, the second side, the first end, and the second end at an interior of the single structure, wherein one or more of the plurality of vertical conduits converge with at least one of the plurality of horizontal conduits at the interior of the single structure, and wherein one or more of the plurality of horizontal conduits converge to form at least one cross-shaped conduit at the interior of the single structure.

7 Claims, 11 Drawing Sheets

UNIVERSAL FLUID FLOW ADAPTOR

CROSS-REFERENCE TO RELATED APPLICATIONS

This application claims priority under 35 U.S.C. §119(e) to U.S. Provisional Patent Application No. 60/979,788, filed on Oct. 12, 2007, entitled "Universal Fluid Flow Adaptor", which is incorporated by reference herein in its entirety for all purposes.

FIELD OF THE INVENTION

The present invention relates to gas delivery systems. More particularly, the present invention relates to a universal fluid flow adaptor for gas delivery systems.

BACKGROUND OF THE INVENTION

Conventional semiconductor etch processing systems utilize gas sticks which are a series of gas distribution and control components such as a mass flow controller, one or more pressure transducers and/or regulators, a heater, one or more filters or purifiers, and shutoff valves. The components used and their particular arrangement in a gas stick can vary depending upon their design and application, with many component arrangements being known in the art. In a typical semiconductor processing arrangement, over seventeen gases are connected to the chamber via gas supply lines, gas distribution components and substrates, and mixing manifolds. These are attached to a base plate forming a complete system known as "gas panel" or "gas box".

The conventional semiconductor etch processing system depends on the use of several hazardous and non-hazardous processing gases and carefully measured delivery of over seventeen gases from the gas source to the processing plasma chamber via the gas supply lines in a synchronized mode. Such systems usually require gas delivery panel for coupling high purity gases for semiconductor etch processing systems or other thin film coating processes.

In semiconductor manufacturing, processes have become increasingly intolerant of particle contamination as the dimensions of semiconductor devices decrease and there is less room to accommodate more components. One source for particle contamination is the gas stick itself that delivers gases from the source of high purity gases to the semiconductor processing chamber where such particle contaminants commonly get deposited onto the semiconductor devices that are being processed. Another source for particle contamination is the exposure of components in a gas delivery system to room air during maintenance and repair of individual gas delivery components.

One approach to eliminating connection parts, such as tubing and couplers, facilitating maintenance of the components of the gas stick, and to reduce contamination is to "down mount" the components on multiple manifold blocks and connection weldments. These are also known as IGS or surface mounted gas delivery systems. However, each component of a gas stick typically comprises highly machined parts, making each component relatively expensive to manufacture and replace. When a component fails, the entire component is replaced even though in most instances the failure is mechanical (and in the case of a mass flow sensor, it is the sensor that usually fails). Each component is typically constructed with a mounting block, which in turn is made with multiple machine operations, making the component expensive. Thus, while down mounting the component parts on multiple fixing blocks solves one problem, it still is relatively expensive to replace defective parts.

Furthermore, gas panels are typically manufactured with three or more gas sticks since manufacturing less gas sticks is expensive and uses additional parts that may not be necessary to use. Thus, a user has no option other than having a set number of gas sticks. For semiconductor applications, the common number of gas sticks is 3, 6, 9, 12, and 16. However, if a user has a 9 gas stick gas panel installed and wants to add one or two additional gas sticks, the user would be required to buy a gas pallet having a minimum of at least three gas sticks. There is no efficient method of connecting a single gas stick to the existing gas panels without removing the entire gas stick, risking contamination, and/or using additional manual effort and time to remove and reinstall the gas delivery components.

Alternatively, should the user have a 9 gas stick gas panel installed and later only needs to use 7 gas sticks, 2 gas sticks would not be used on the gas panel. This would result in excess parts of the gas panel that is not used and removal of the excess gas sticks from the gas panel would not be possible. This situation creates "dead-leg", a section of conduit or manifold through which gas does not flow. Dead-leg is considered to be a source of contamination.

BRIEF DESCRIPTION OF THE INVENTION

The present invention provides for a universal fluid flow adaptor to provide for maximum flexibility in gas delivery systems, such as IGS surface gas mounted gas delivery systems. In one embodiment, a universal fluid flow adaptor may be formed of a single structure having a top surface opposite a bottom surface, a first side opposite a second side, and a first end opposite a second end. The universal fluid flow adaptor may have a plurality of vertical conduits to receive a gas flow, the plurality of vertical conduits extending through the single structure from the top surface to the bottom surface, a plurality of horizontal conduits to receive a gas flow, the plurality of horizontal conduits extending through the first side, the second side, the first end, and the second end at an interior of the single structure, wherein one or more of the plurality of vertical conduits converge with at least one of the plurality of horizontal conduits at the interior of the single structure, and wherein one or more of the plurality of horizontal conduits converge to form at least one cross-shaped conduit at the interior of the single structure.

In another embodiment, a flexible gas delivery apparatus may have at least one gas stick having a plurality of gas delivery components thereon, a plurality of universal fluid flow adaptors interconnected to form a substrate, each of the plurality of manifold blocks coupled to and in fluid communication with one of the plurality of gas delivery components. Each of the plurality of universal fluid flow adaptors is a single structure having a plurality of vertical conduits to receive a gas flow, the plurality of vertical conduits extending through the single structure from a top surface to a bottom surface, a plurality of horizontal conduits to receive a gas flow, the plurality of horizontal conduits extending through a first side, a second side, a first end, and a second end at an interior of the single structure, wherein one or more of the plurality of vertical conduits converge with at least one of the plurality of horizontal conduits at the interior of the single structure, and wherein one or more of the plurality of horizontal conduits converge to form at least one cross-shaped conduit at the interior of the single structure.

In yet another embodiment, a method for forming a universal fluid flow adaptor from a single structure may comprise forming a plurality of vertical conduits to receive a fluid flow, the plurality of vertical conduits extending through a top surface to a bottom surface, creating a plurality of horizontal conduits to receive a fluid flow, the plurality of horizontal conduits extending through a first side, a second side, a first end, and a second end, wherein one or more of the plurality of vertical conduits converge with at least one of the plurality of horizontal conduits at an interior of the single structure, and wherein one or more of the plurality of horizontal conduits converge to form a cross-shaped conduit at the interior of the single structure.

These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention provides for a universal fluid flow adaptor to allow for maximum flexibility in gas delivery systems, such as IGS surface gas mounted gas delivery systems. The adaptor may be used with any other devices other than semiconductor devices such as medical devices, spectrophotography devices, and any other devices requiring fluid delivery. The universal fluid flow adaptor may be a single machined block having a plurality of conduits or channels therein to allow for a variety of flow directions for a gas or liquid. The universal fluid flow adaptor may be formed from any stainless steel material such as 316L vacuum induction melting or vacuum arc re-melting stainless steel.

Figure 1A:
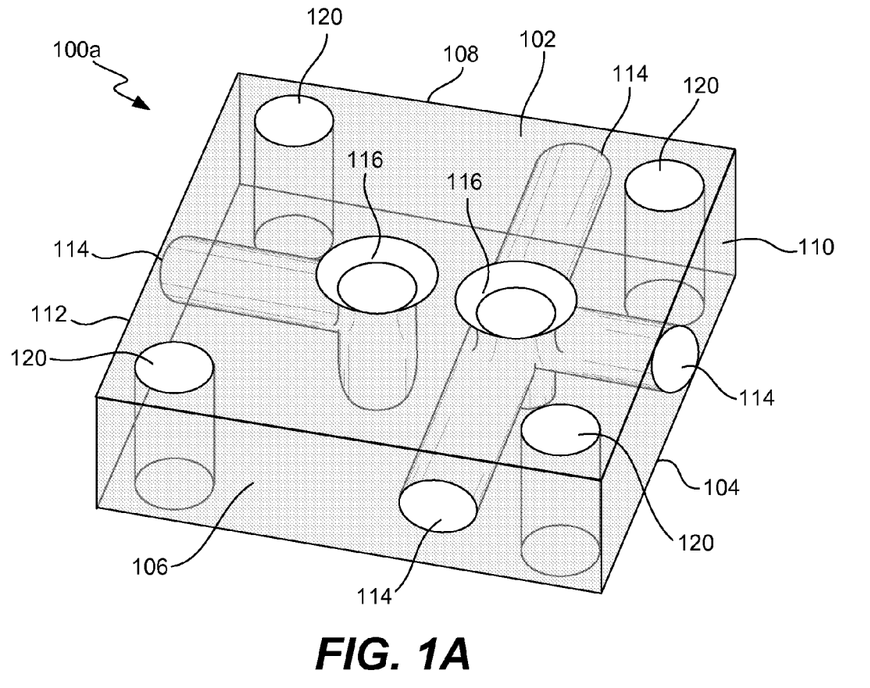
FIGS. 1A-1D illustrate exemplary universal fluid flow adaptors.
Figure 1B:
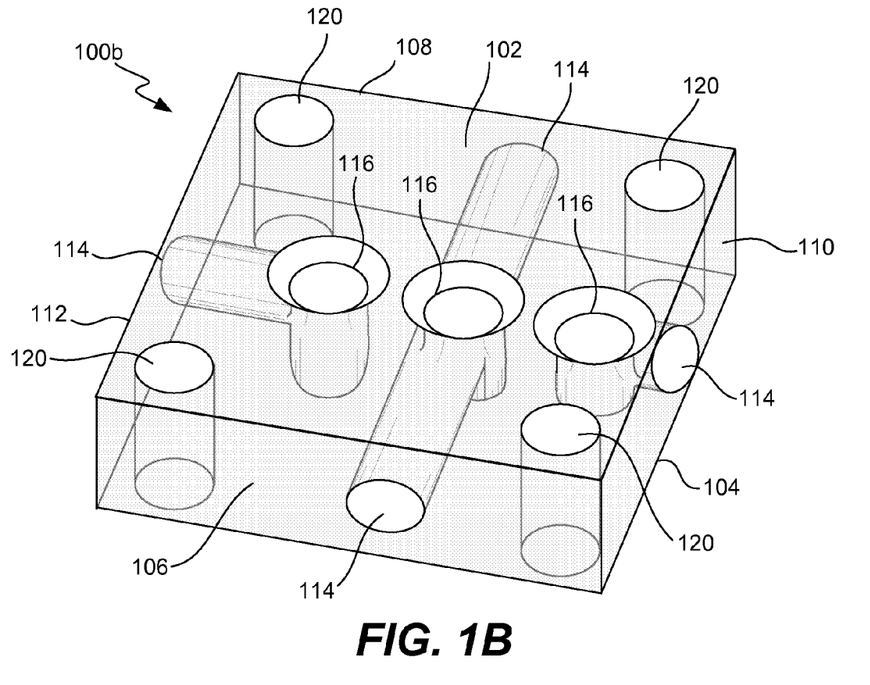

FIGS. 1A-1D illustrate examples of the universal fluid flow adaptors. FIG. 1A is a perspective view of a two-port universal fluid flow adaptor and FIG. 1B is a perspective view of a three-port universal fluid flow adaptor. Referring to FIGS. 1A and 1B, the universal fluid flow adaptor 100 may be a single structure having a top surface 102 opposite a bottom surface 104, a first side 110 opposite a second side 112, and a first end 108 opposite a second end 106. The adaptor 100 may have a plurality of vertical channels or conduits 116 to receive and communicate a fluid (a gas, liquid, or combination thereof). As the term is used herein, a conduit refers to a channel, tube, routing port, pipe, or the like that permits gaseous or fluid communication between two locations. The vertical conduits 116 may extend through the adaptor 100 from the top surface 102 to the bottom surface 104 in the interior of the adaptor 100. Although the vertical conduits 116 are illustrated extending through the adaptor 100 in a straight line along the same vertical axis, it will be appreciated that the vertical conduit may having an opening on the top surface that is different that the opening on the bottom surface. For example, the vertical conduit 116 may have an opening on the top surface 102, intersect a horizontal conduit 114 within the adaptor 100, and exit the adaptor 100 at the bottom surface 104 at a location that is different from the vertical axis of the opening at the top surface 102.

Figure 3:
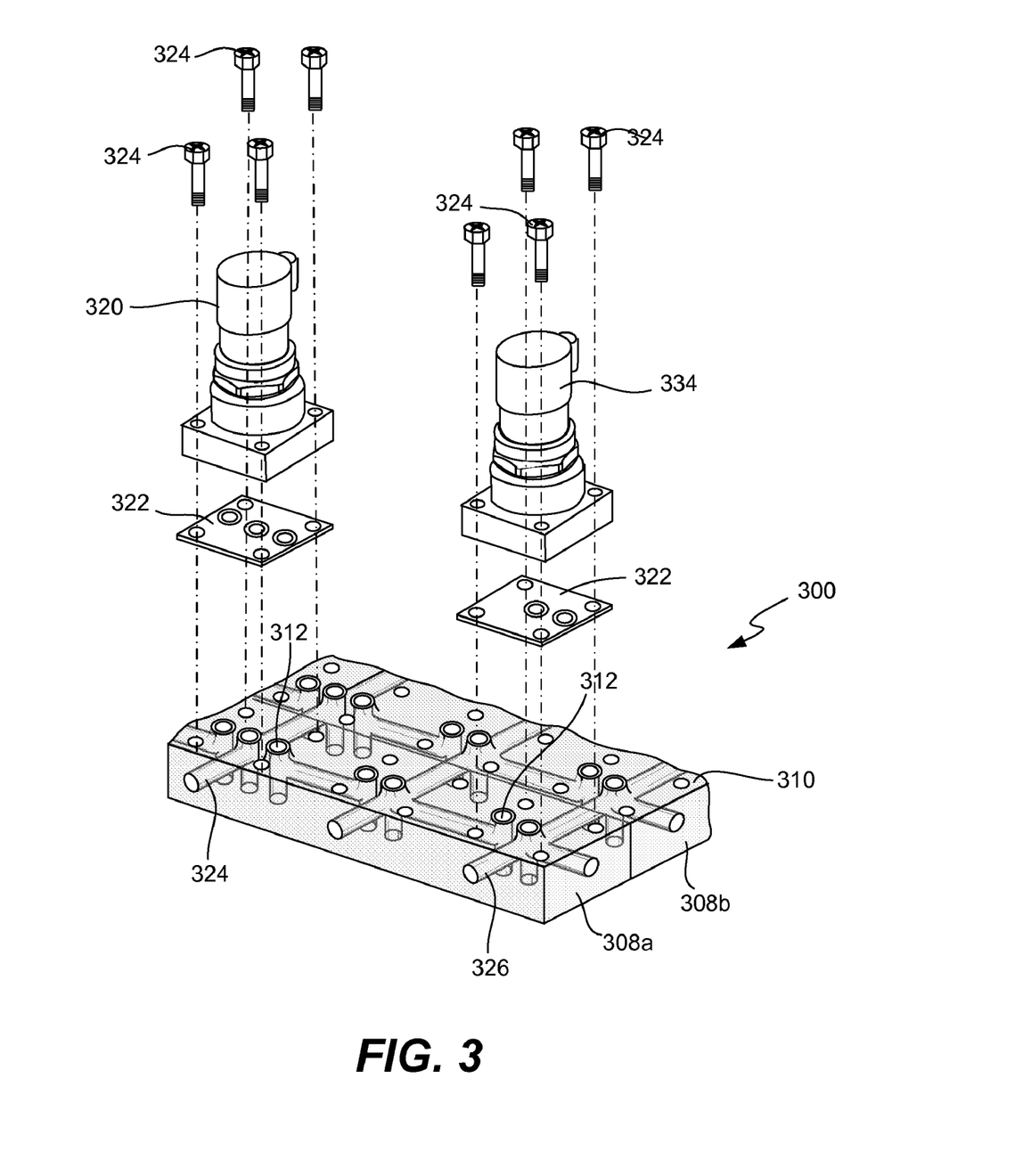
FIG. 3 illustrates the universal fluid flow adaptor in use with an IGS gas delivery system.
Figure 4A:
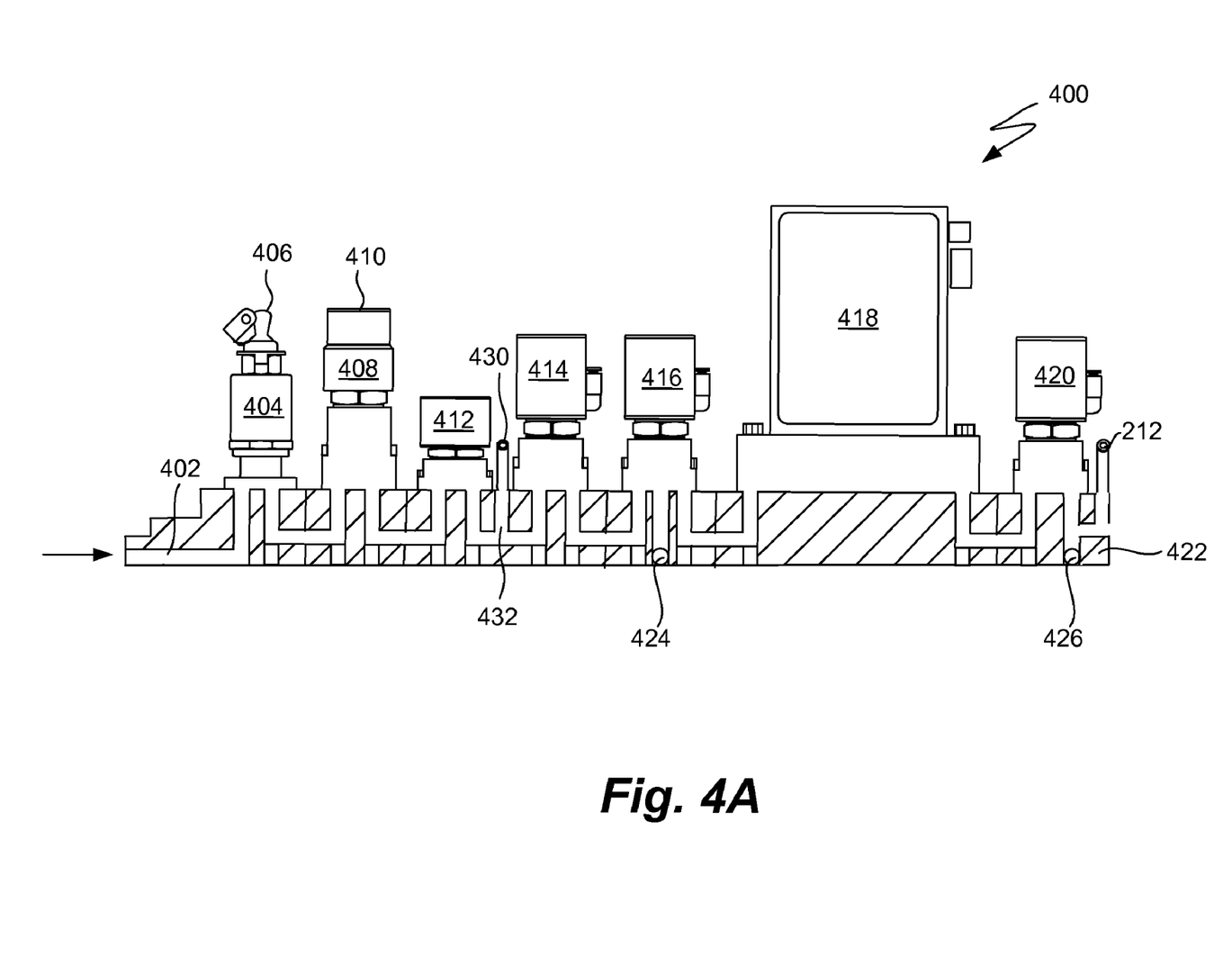
FIGS. 4A and 4B illustrate exemplary gas sticks.
Figure 4B:
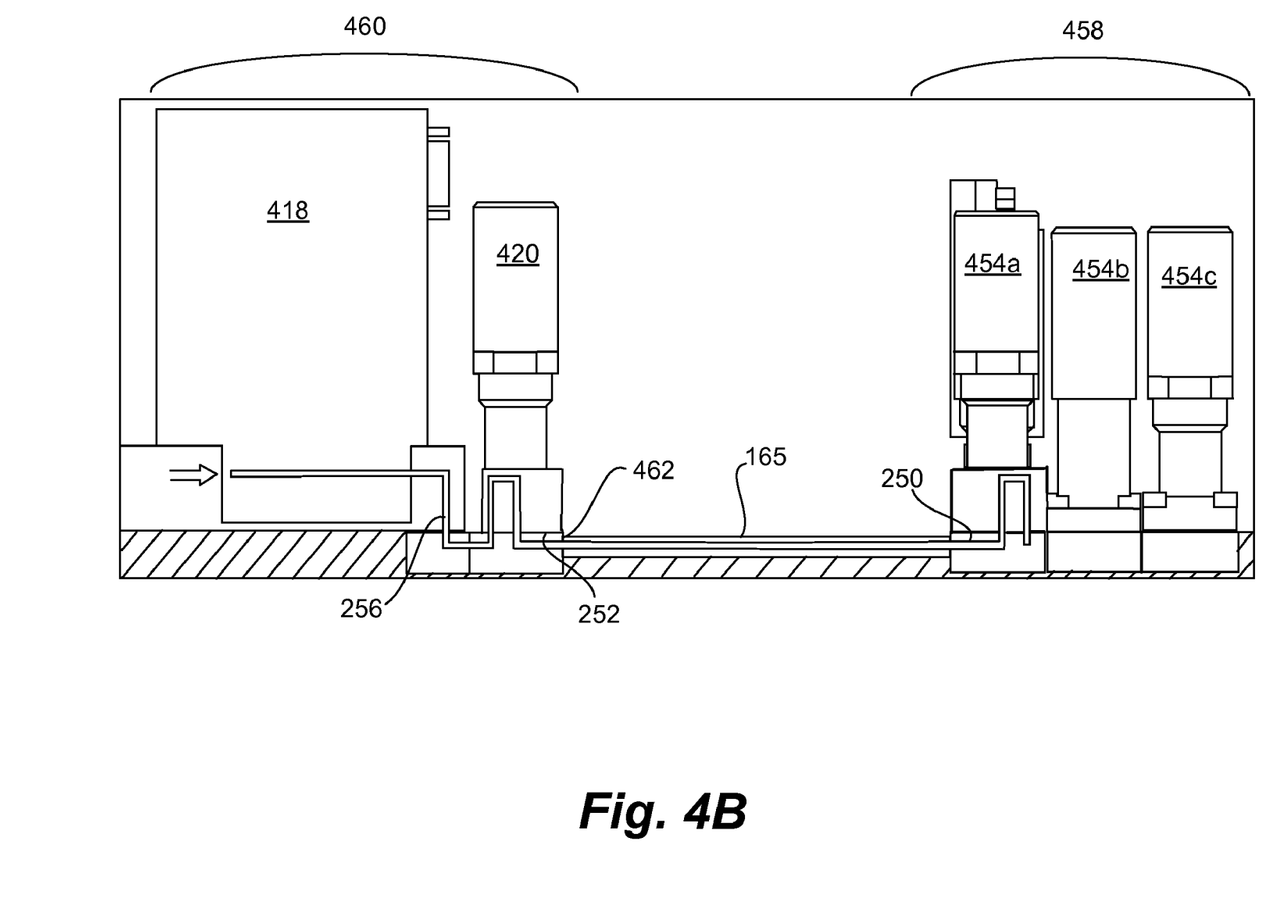

As illustrated in FIG. 1A, one of the vertical conduits 116 may be an entrance port and the other vertical conduit 116 may be an exit port. As illustrated in FIG. 1B, one vertical conduit 116 may be an entrance port, another vertical conduit 116 may be an exit port, and the last vertical conduit 116 may be a discharge port. Gas stick components, such as valves (see, eg. FIGS. 3, 4A, and 4B), may be coupled to the top surface 102 of the adaptor 100 such that gases enter into the valve through the entrance port and exit through the exit port.

The adaptor 100 may also have a plurality of horizontal channels or conduits 114 to receive and communicate a fluid (a gas, liquid, or combination thereof). The horizontal conduits 114 may extend through the first side 110 to the second side 112 and/or from the first end 108 to the second end 106 in the interior of the adaptor 100. As illustrated, the vertical conduits 116 may converge with the horizontal conduit 114 at the interior of the adaptor 100 and the horizontal conduits 114 may converge with each other to form at least one cross-shaped or t-shaped conduit. Thus, a fluid may have at least four different flow paths from which to flow.

The adaptor 100 may also have a plurality of apertures 120. Although illustrated with the apertures 120 extending through the top surface 102 to the bottom surface 104, the apertures may only extend partially through the top surface 102 or the bottom surface 104. Additionally, the apertures 120 may be threaded or designed to receive an attachment means, such as a screw, to couple the adaptors 100 to a gas delivery component, such as a mixing valve 420 (FIG. 4).

Figure 1C:
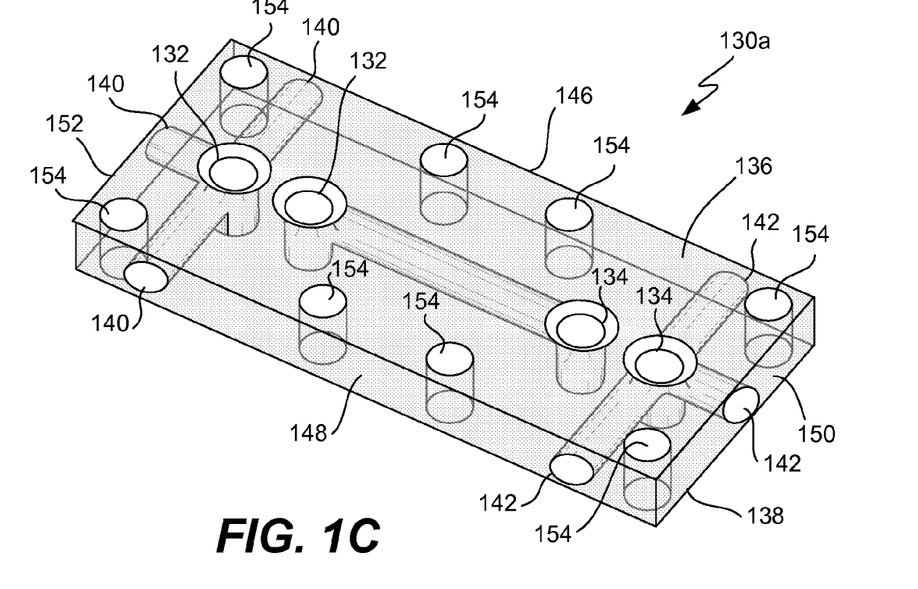
Figure 1D:
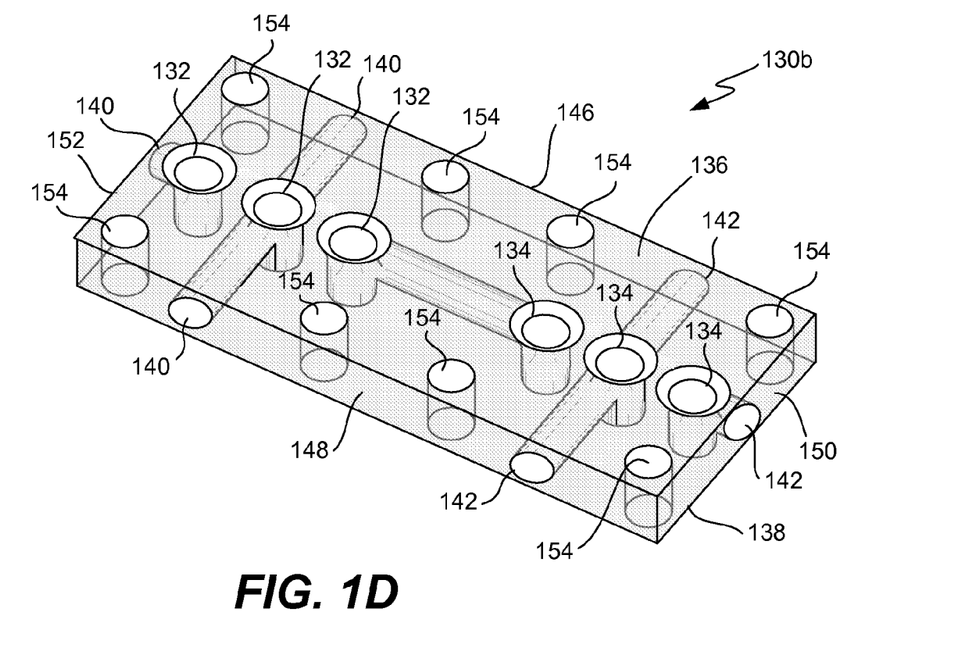

FIGS. 1C and 1D illustrate other embodiments of the universal fluid flow adaptors. The single structure of FIGS. 1A and 1B may be elongated as illustrated in FIGS. 1C and 1D. FIG. 1C illustrates a two-port adaptor and FIG. 1D illustrates a three-port adaptor. However, the number of ports on the adaptor is not meant to be limiting as any number of ports may be used as illustrated in FIG. 3. The adaptor may have both two-ports and three-ports therein.

Referring now to FIGS. 1C and 1D, the universal fluid flow adaptors 130 may have a first set of vertical channel or conduits 132 and a second set of vertical channel or conduits 134 to receive and communicate a fluid (a gas, liquid, or combination thereof). The vertical conduits 132, 134 may extend through the adaptor 130 from the top surface 136 to the bottom surface 138 in the interior of the adaptor 130.

The adaptor 130 may have a first set of horizontal channels or conduits 140 and a second set of horizontal channels or conduits 142 to receive and communicate a fluid (a gas, liquid, or combination thereof). The horizontal conduits 140, 142 may extend through the first side 150 to the second side 140 and/or from the first end 146 to the second end 148 in the interior of the adaptor 130. As illustrated, the vertical conduits 132, 134 may converge with the horizontal conduit 132, 134 at the interior of the adaptor 130 and the horizontal conduits 140, 142 may converge with each other to form at least one cross-shaped or t-shaped conduit.

The number of sets of vertical and/or horizontal conduits is not meant to be limiting as the adaptor may be manufactured to have a longer length and a plurality of sets. For example, the adaptor may be extended further to include a third, fourth, and/or fifth set of conduits.

The adaptor 130 may also have a plurality of apertures 154 extending through the top surface 136 to the bottom surface 138. The plurality of apertures 154 may be designed to receive an attachment means, such as a screw, to couple the adaptors 130 to a gas delivery component, such as a mixing valve.

Figure 2A:
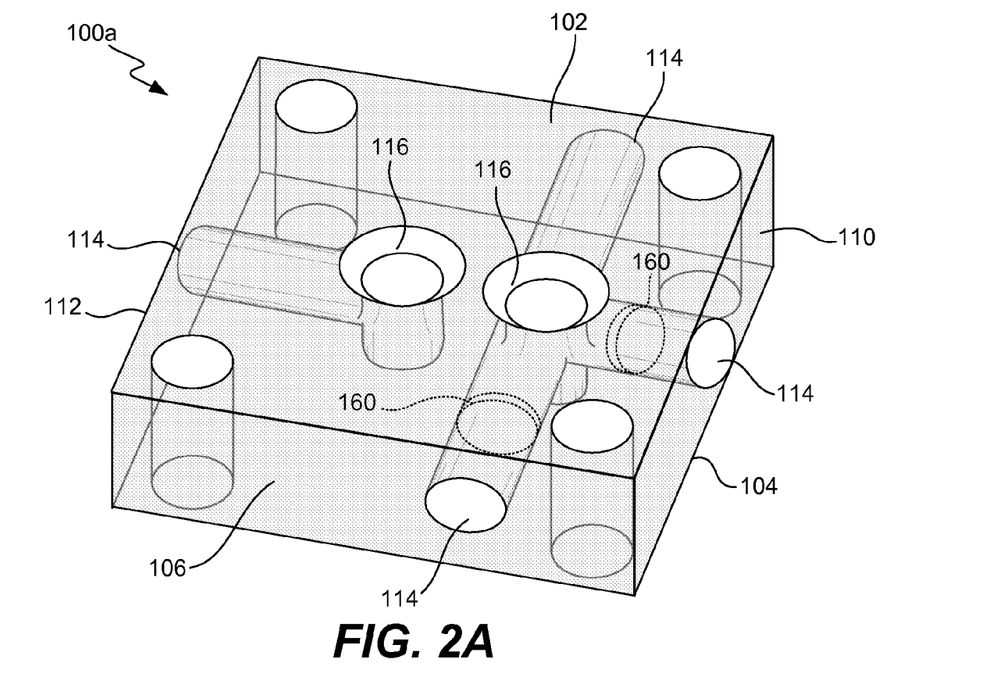
FIGS. 2A, 2B, 2C, 2D, 2E, and 2F are perspective views illustrating example uses of the universal fluid flow adaptors.

FIGS. 2A, 2B, 2C, 2D, 2E, and 2F are perspective views illustrating example uses of the universal fluid flow adaptors. FIG. 2A illustrates the universal fluid flow adaptor in use with a sealing member. The sealing member may be formed from any stainless steel material such as 316L vacuum induction melting or vacuum arc re-melting stainless steel. The universal fluid flow adaptor 100a may give a user the flexibility to direct the desired and/or necessary flow channels. Any unused conduits 116, 114 may be sealed with a sealing member 160 to prevent dead legs. The sealing member 160 may be any known sealing member, such as a plug, and the like to prevent air flow through the conduit. The plug may be welded to the adaptor 100a to ensure that no fluids leak from the conduit. Furthermore, the plug may vary in length in order to reduce dead leg as much as possible.

The sealing member 160 may be used to seal the horizontal conduit 114 on the first side 110, the second side 112, the first end 108, or the second end 106. Although not illustrated, the sealing member 160 may also be used to seal the vertical conduits 116 on the top surface 102 and/or the bottom surface 104.

Figure 2B:
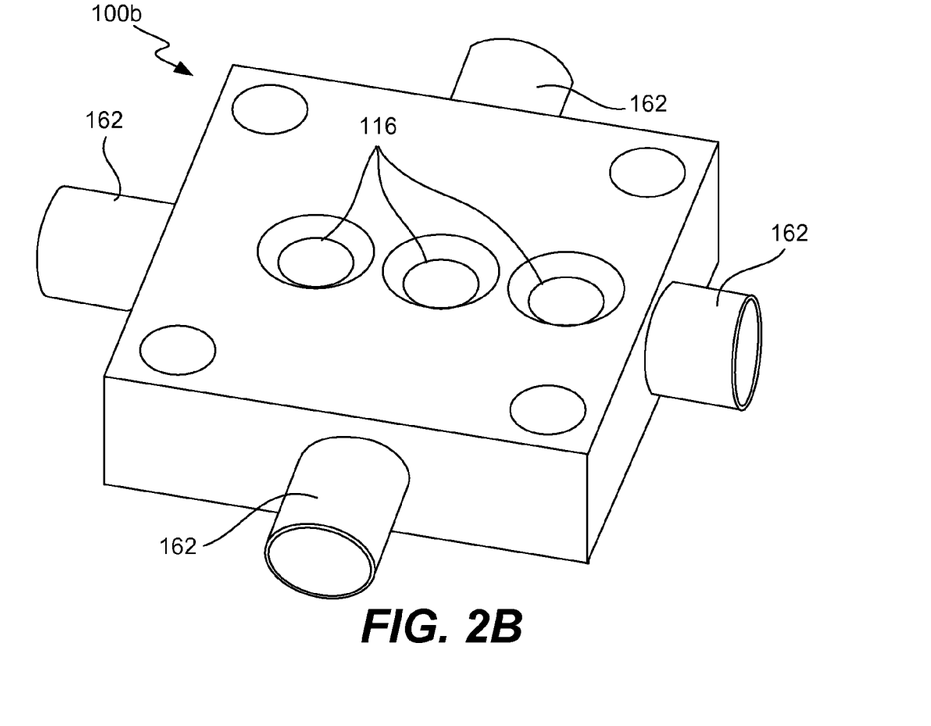

FIG. 2B illustrates the universal fluid flow adaptor in use with a connector. A connector 162 may be used to fluidly connect the adaptor 100b to other adaptors. The tube may be coupled to the conduit 114 on the first side 110, the second side 112, the first end 108, or the second end 106. Although not illustrated, the sealing member 160 may also be used to seal the vertical conduits 116 on the top surface 102 and/or the bottom surface 104. The connector 162 may be a tube, pipe, VCR fitting, or any other type of connector that allows fluid to flow therethrough. The connector 162 may be coupled to the conduit 116, 114 via any known sealing method, such as welding, to ensure that no fluids leak from the conduit 116, 114. In another example, the horizontal conduit 114 may be threaded to receive a threaded sealing member such as a VCR fitting and/or attachment member.

Figure 2C:
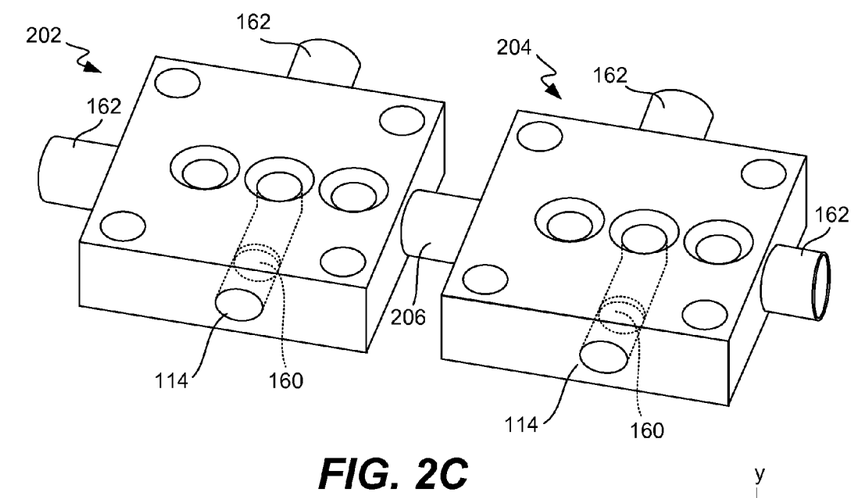

In use, as illustrated in FIG. 2C, adaptor 202 may be in fluid communication with adaptor 204 via connector 206. Although illustrated with two adaptors in fluid communication, any number of adaptors may be connected via connectors 162. Furthermore, although illustrated with adaptors 202, 204 coupled along the x-axis, adaptors may also be fluidly connected along the z-axis. This allows for the flexibility to couple multiple gas sticks together. For example, a user may add a single gas stick to an existing gas panel by fluidly coupling two adaptors together along the z-axis by using connectors 162. This may give a user flexibility to connect as many adaptors as desired to direct and configure the desired fluid flow. Any unused conduits 116, 114 may be sealed as illustrated with the use of sealing members 160. In an alternative embodiment, connector 206, 162 may be a T-connector (not shown) to allow for a vertical flow of gasses between adaptors 202, 204. Use of the T-connector may allow a user to test the gasses as further discussed below with reference to the test port illustrated in FIG. 2D.

Figure 2D:
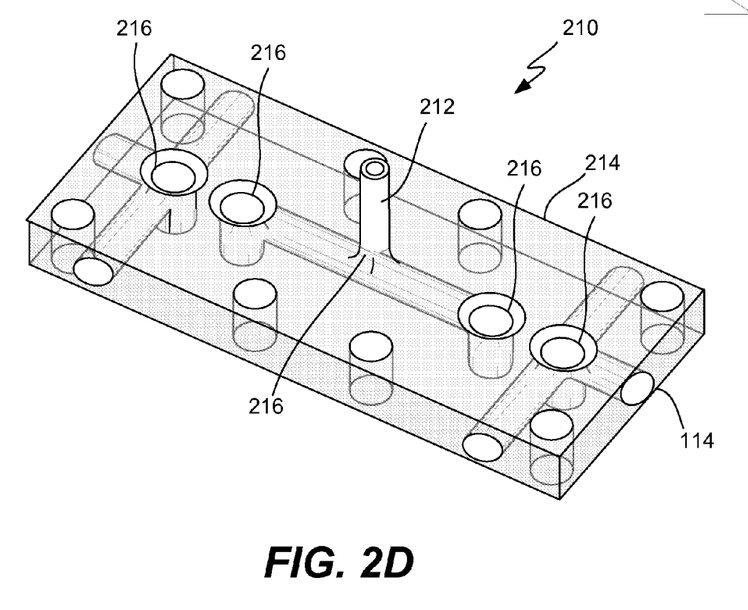

FIG. 2D illustrates an example universal fluid flow adaptor having a test port. The adaptor 210 may have a test port 212 extending upwardly from the top surface 214. The test port 212 may be in fluid communication with at least one of the plurality of vertical conduits 216 that is in fluid communication with a horizontal conduit 114. The test port 212 may be used to ensure proper gasses are flowing through the gas delivery system. Alternatively, the test port 212 may be used as an additional gas delivery component. For example, the test port 212 may be used to check moisture levels, conduct leak tests of the facility lines, be used as an additional purge valve, and the like. The test port 212 may be small enough to be positioned between two gas delivery components such as the filter 412 and the primary shut off valve 414 (FIG. 4A).

Figure 2E:
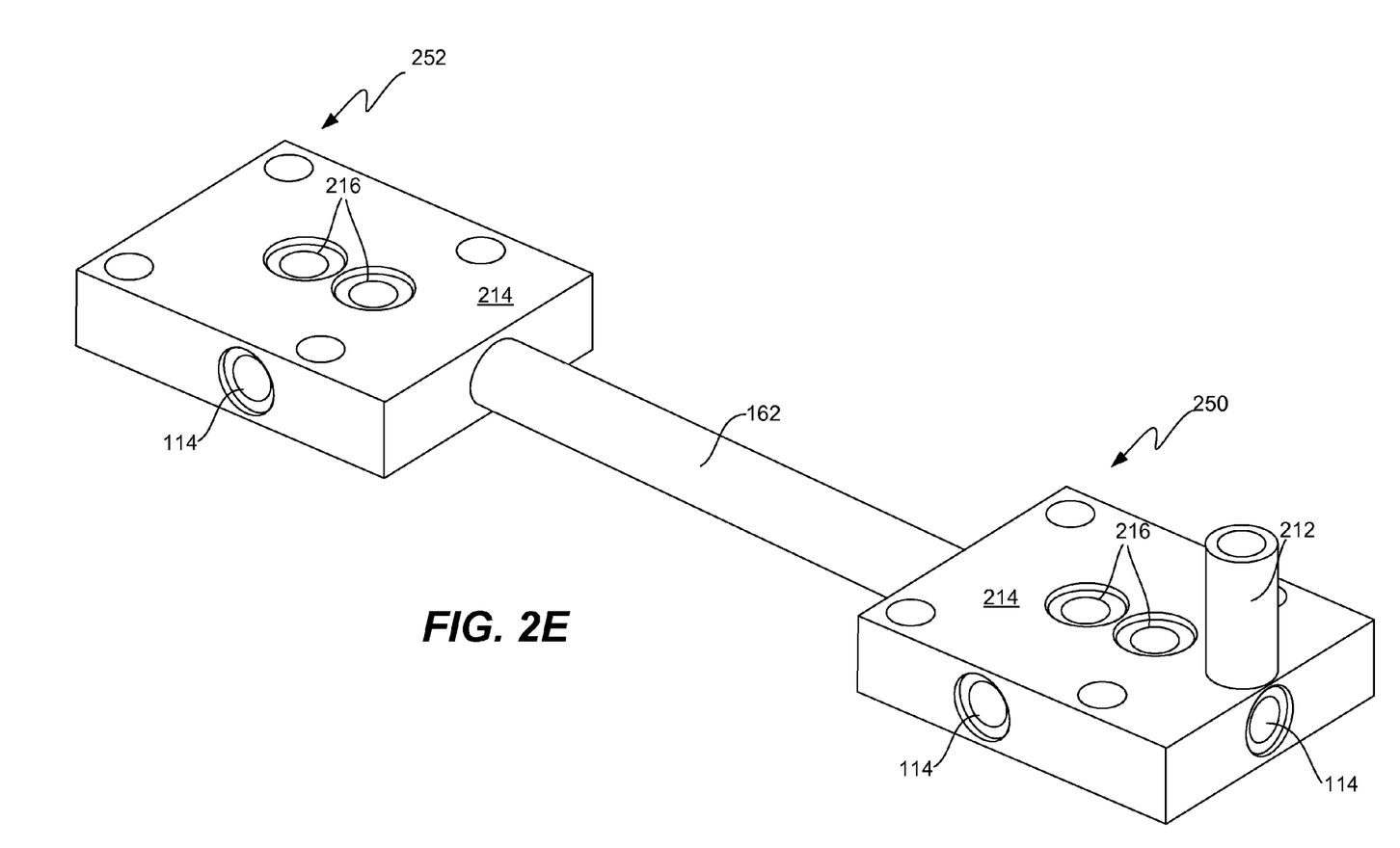
Figure 2F:
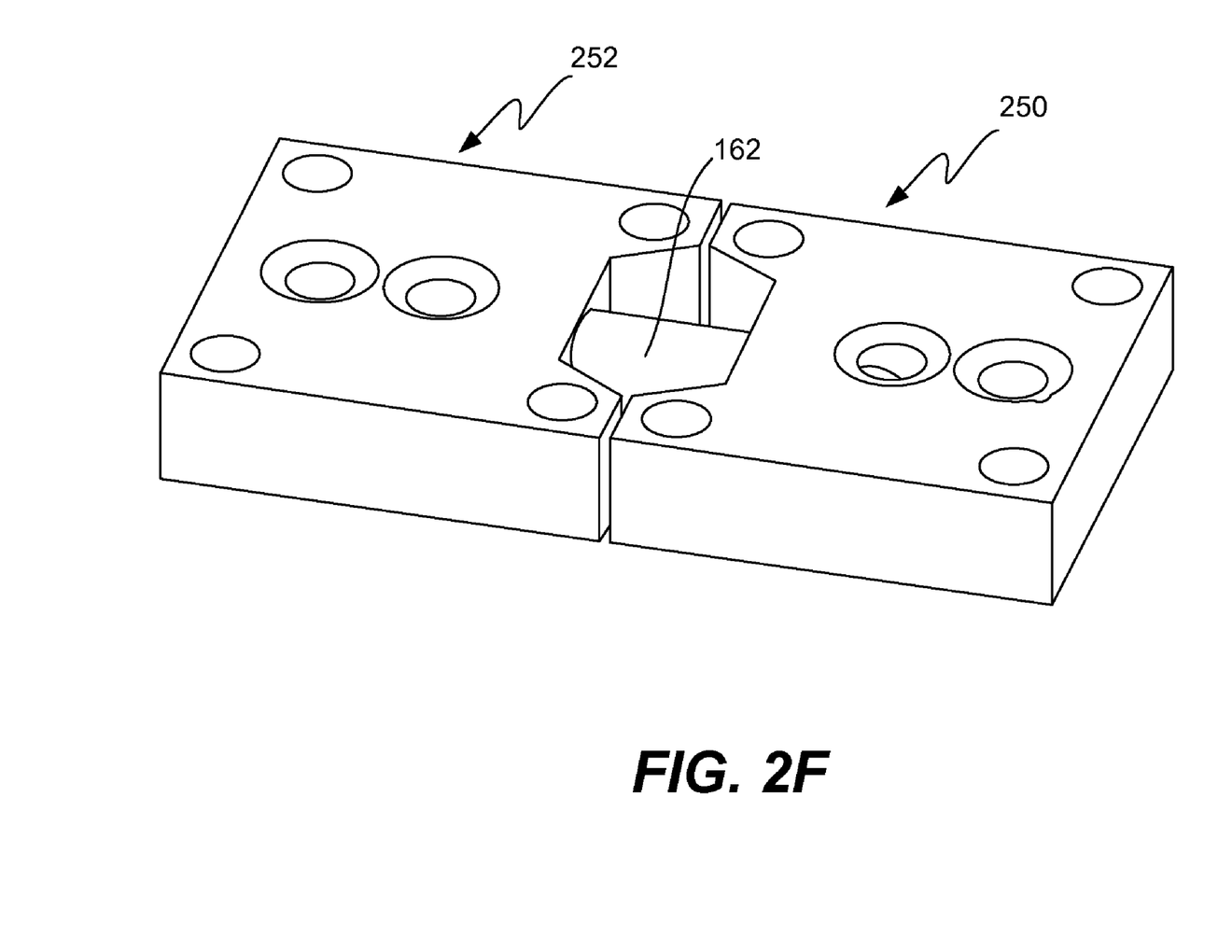

FIGS. 2E and 2F illustrate other example universal fluid flow adaptors having a connector 162 of variable length. Thus, connector 162 may be long as illustrated in FIG. 2E or short as illustrated in FIG. 2F to connect adaptors 250, 252. Furthermore, adaptor 250 of FIG. 2E is illustrated as having a test port 212 extending upwardly from the top surface 214.

FIG. 3 illustrates the universal fluid flow adaptor in use with an IGS gas delivery system. Although illustrated with two gas delivery components for clarity, any number of gas delivery components may be used. In one embodiment as illustrated, the universal fluid flow adaptor 308 may be a single machined block having a plurality of conduits such that the horizontal conduits may be configured or designed to be a pump/purge manifold 324 and/or a mixing manifold 326, both substantially parallel to each other. The pump/purge manifold 324 may be used to purge corrosive gasses from the gas stick 300. The mixing manifold 326 may be in fluid communication with the mixing valve and used to mix the gases in any quantity desired by a user. In another embodiment, a plurality of adaptors may be joined together to be in fluid communication with each other to form the substrate 308. Thus, conventional base plates and substrates currently used in IGS gas delivery systems are not necessary, thereby reducing cost, weight, and contamination. Furthermore, maintenance and accessibility of the manifold may be easier as only a portion of the gas delivery component needs to be removed for access.

The purge valve 320 may be secured to the substrate 308 by any means. In one embodiment, the purge valve 320 may be secured to the substrate 308 with a pressure sealer 322. In another embodiment, any fastening means, such as screws 324, may be used to secure the purge valve 320 to the substrate 308. In yet another embodiment, a combination of both a pressure sealer 322 and fastening means 324 may be used.

A discharge port of the purge valve 320 may be in fluid communication with one of the vertical conduits 312 in the substrate 308 that is in fluid communication with the pump/purge manifold 324. This allows the discharge port to be in fluid communication with the pump/purge manifold 324 on the substrate 308.

The mixing valve 334 may also be secured to the substrate 308 with a pressure sealer 322, any fastening means 324, or a combination of both. The exit port of the mixing valve 334 may be in fluid communication with one of the vertical conduits 312 in the substrate 308 that is in fluid communication with the mixing manifold 326. This allows the exit port to be in fluid communication with the mixing manifold 326 on the substrate 308.

Thus, the universal fluid flow adaptor may replace existing pump/purge and mixing manifolds. This reduces the amount of material and cost to produce or make a gas stick. Furthermore, use of the universal fluid flow adaptors allows for the flexibility in adding and/or removing as many single gas sticks as desired.

Single gas sticks are expensive to manufacture, difficult to mount in the gas cabinet, and uses additional parts that may not be necessary to use which may lead to contamination. However, with the universal fluid flow adaptor, single gas sticks may be joined to an existing gas panel efficiently and quickly. Use of the universal fluid flow adaptor makes joining a single gas stick less expensive, easy to mount in the gas cabinet, and does not use excess parts. Thus, only the purge valve 320 and mixing valve 334 needs to be removed when joining a single gas stick.

FIGS. 4A and 4B illustrate exemplary gas sticks. Although illustrated with certain components, the specific components are not intended to be limiting as different components may be used and/or less or more components may be used to form the gas stick. Additionally, although described with a single gas stick, the number of gas sticks is not intended to be limiting. As discussed above, a plurality of gas sticks form a gas box or panel. In one embodiment, the valve on the components is an integrated surface mount valve. In general, an integrated surface mount component is a gas control component (e.g., valve, filter, etc.) that is connected to other gas control components through channels on a substrate assembly, upon which the gas control components are mounted. This is in contrast to gas control components that are generally attached through bulky conduits with VCR (vacuum coupled ring) attachments.

The gas stick 400 may have a gas stick input port 402 to input a supply gas. A manual valve 404 may be used for carrying out the supply or isolation of the supply of supply gas. The manual valve 404 may also have a lockout/tagout device 406 above it. Worker safety regulations often mandate that plasma processing manufacturing equipment include activation prevention capability, such as a lockout/tagout mechanism. Generally a lockout is a device that uses positive means such as a lock, either key or combination type, to hold an energy-isolating device in a safe position. A tagout device is generally any prominent warning device, such as a tag and a means of attachment that can be securely fastened to energy-isolating device in accordance with an established procedure.

A regulator 408 may be used to regulate the gas pressure or the supply gas and a pressure gauge 410 may be used to monitor the pressure of the supply gas. In one embodiment, the pressure may be preset and not need to be regulated. In another embodiment, a pressure transducer (not illustrated) having a display to display the pressure may be used. The pressure transducer may be positioned next to the regulator 408. A filter 412 may be used to remove impurities in the supply gas. A primary shut-off valve 414 may be used to prevent any corrosive supply gasses from remaining in the gas stick. The primary shut-off valve 414 may be two-port valve having an automatic pneumatically operated valve assembly that causes the valve to become deactivated (closed), which in turn effectively stops plasma gas flow within the gas stick. Once deactivated, a non-corrosive purge gas, such as nitrogen, may be used to purge the gas stick. The purge valve 416 may have three-ports to provide for the purge process—an entrance port, an exit port and a discharge port.

A test port 212 may be positioned between the gas delivery components such as the filter 412 and the primary shut off valve 414. The test port 430 may be coupled to a vertical conduit on the substrate 422 and be in fluid communication with a horizontal conduit 432. The test port may be used to ensure proper gasses are flowing through the gas delivery system. Alternatively, the test port 212 may be used as an additional gas delivery component. For example, the test port 212 may be used to check moisture levels, conduct leak tests of the facility lines, be used as an additional purge valve, and the like. In one example, a user may desire to purge the gasses from the manual valve 404, regulator 408, and filter 412 only. Thus, the user may close of the primary shut off valve 414 and insert a purge gas into the test port 430. The purge gas may then purge the gasses from the manual valve 404, regulator 408, and filter 412 without disturbing the other gas delivery components such as the mass flow controller ("MFC") 418. In another example, a user may want to introduce a carrier gas between the filter 412 and the primary shut off valve 414. The test port 212 may be used to introduce and deliver the carrier gas.

Adjacent the purge valve 416 may be the MFC 418. The MFC 418 accurately measures the flow rate of the supply gas. Positioning the purge valve 416 next to the MFC 418 allows a user to purge any corrosive supply gasses in the MFC 418. A mixing valve 420 next to the MFC 418 may be used to control the amount of supply gas to be mixed with other supply gasses on the gas panel.

Each component of the gas stick may be positioned above substrate 422. In one embodiment, a plurality of universal fluid flow adaptors may be coupled together to form substrate 422, a layer of adaptors that creates the flow path of gasses through the gas stick 400. In another embodiment, the universal fluid flow adaptor may be a single machined block. The gas delivery components may be positioned on the manifold blocks by any known means such as with a pressure fitting sealant (eg., C-seal) and the like.

FIG. 4B illustrates an exemplary use of the example adaptors illustrated in FIG. 2E to connect multiple gas sticks. Gas stick 460 may be coupled to gas stick 458 using adaptors 252 and 250. Adaptors 252 and 250 may be coupled together by connector 162. Thus, in one example, gas flow 256 may flow from the MFC 418 to the mixing valve 420 and out the exit port 462 into connector 162. Connector 162 may be connected to adaptor 250 such that the gas may continue to flow to other gas components 454*a*-*c* of gas stick 458.

Figure 5:
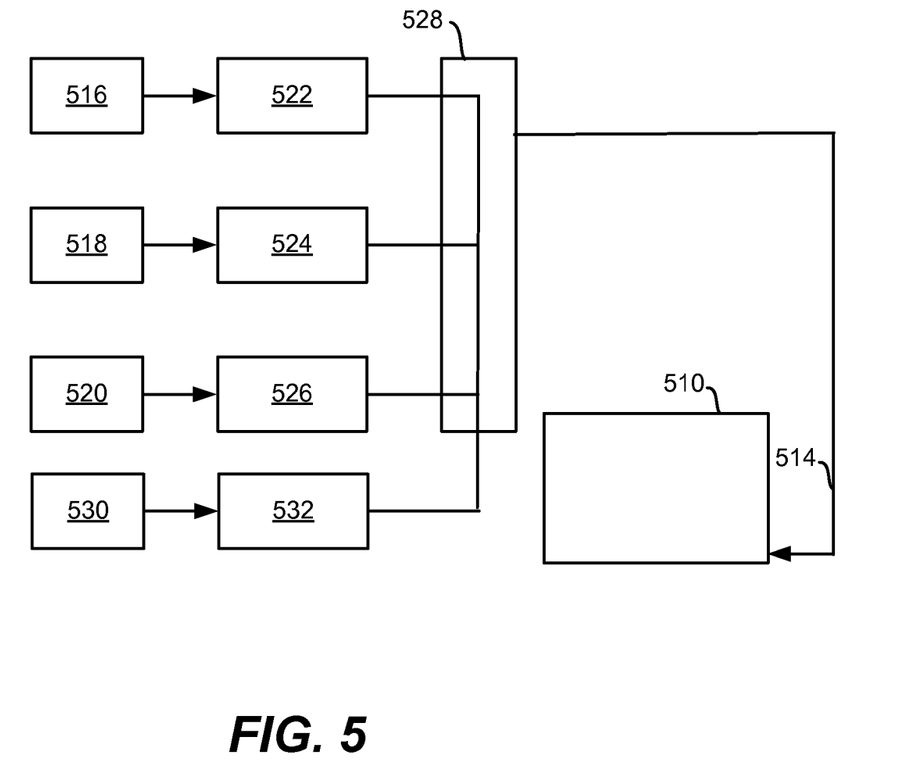
FIG. 5 is a schematic view of an exemplary gas feed device for semiconductor processing.

FIG. 5 is a schematic view of an exemplary gas feed device for semiconductor processing. A plasma processing chamber 510 is supplied processing gas through gas supply line 514. The gas supply line 512 may provide process gas to a showerhead or other gas supply arrangement arranged in the upper portion of the chamber. Additionally, gas supply line 514 may supply processing gas to a lower portion of the chamber such as, for example, to a gas distribution ring surrounding the substrate holder or through gas outlets arranged in the substrate support. However, an alternative dual gas feed arrangement can supply gas to the top center and top perimeter of the chamber. Processing gas may be supplied to gas line 514 from gas supplies 516, 518, 520, 530 the process gasses from supplies 516, 518, 520, 530 being supplied to MFC 522, 524, 526, 532 respectively. The MFC 522, 524, 526, 532 supply the process gasses to a mixing manifold 528 after which the mixed gas is directed to gas flow line 514.

In operation, the user may select the fraction of mixed flow to be delivered to the plasma processing chamber. For example, the user might select a flow of 250 sccm Ar/30 sccm $C_4F_8$/15 sccm $C_4F_6$/22 sccm $O_2$ delivered through line 514. By comparing the total flow, which in this case could be measured by summing all of the flow readouts of the MFC 522, 524, 526, 532 in the gas box, the controller can adjust the degree of throttling in line 514 to achieve the desired flow distribution. Alternatively, an optional total flow meter could be installed just downstream of the mixing manifold 528 to measure the total flow of mixed gas, rather than determining the total flow by summing the readouts of the MFCs 522, 524, 526, 532 in the gas box.

Figure 6:
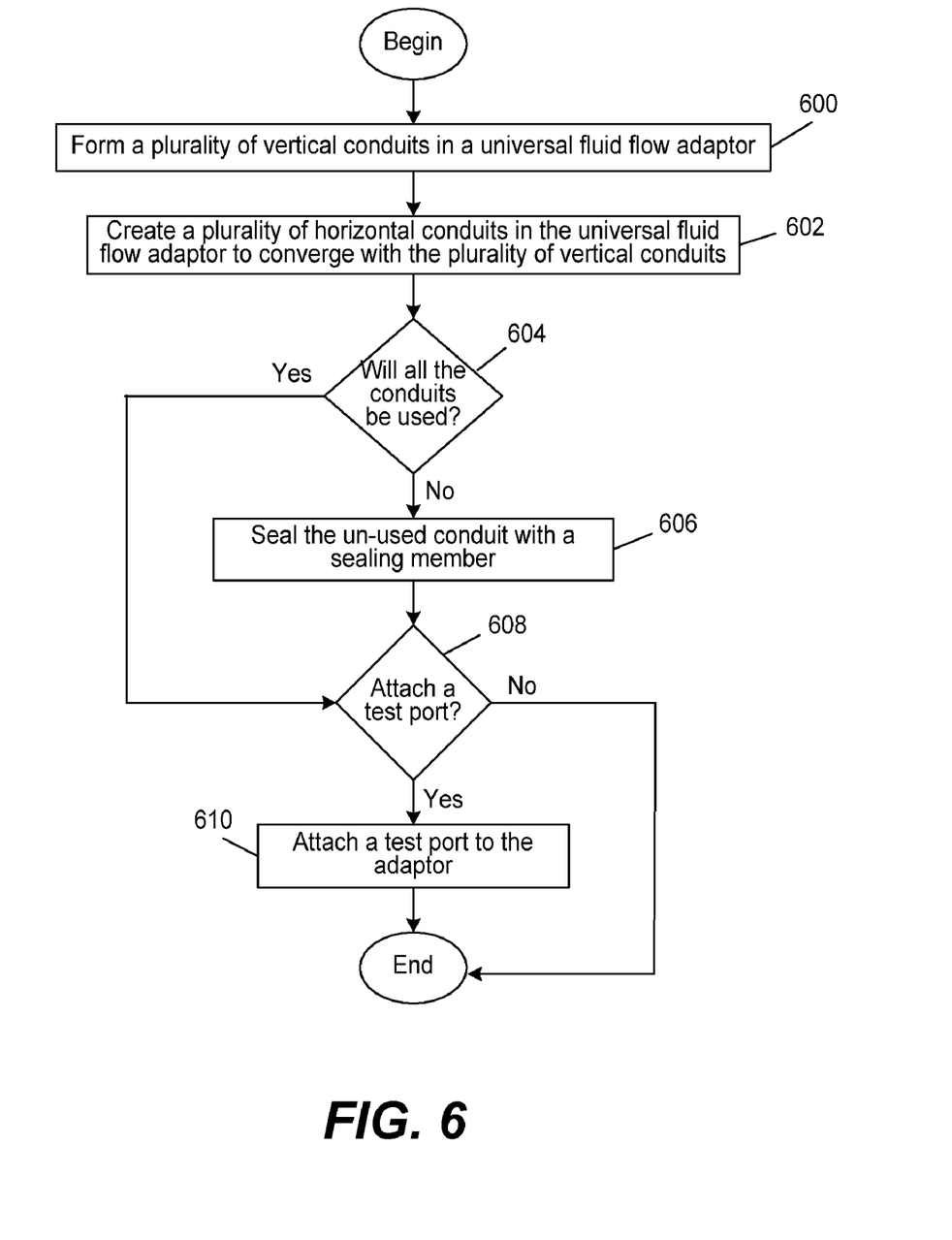
FIG. 6 illustrates a method for forming a universal fluid flow adaptor.

FIG. 6 illustrates a method for forming a universal fluid flow adaptor. A plurality of vertical conduits may be formed in a universal fluid flow adaptor at 600. As the term is used herein, a conduit refers to a channel, tube, routing port, pipe, or the like that permits gaseous or fluid communication between two locations. The universal fluid flow adaptor may be a single machined block having a plurality of conduits or channels therein to allow for a variety of flow directions for a gas or liquid. The universal fluid flow adaptor may be formed from any stainless steel material such as 316L vacuum induction melting or vacuum arc re-melting stainless steel.

A plurality of horizontal conduits may be created in the universal fluid flow adaptor to converge with the plurality of vertical conduits at 602. The horizontal and vertical conduits may converge at an interior of the adaptor. In one embodiment, the plurality of horizontal conduits may each converge to form a cross-shaped conduit at the interior of the adaptor.

The various horizontal and vertical conduits in the adaptor may give a user the flexibility to direct the desired and/or necessary flow channels. However, the user may not need to use all the conduits at 604. Thus, any unused conduits may be sealed with a sealing member at 606 to prevent any dead legs and contamination. The sealing member may be any type of known plug that will prevent air flow through the conduit and may be formed from any stainless steel material such as 316L vacuum induction melting or vacuum arc re-melting stainless steel. The sealing member may be used to seal the horizontal conduit or the vertical conduits.

In another embodiment, a connector may be used in place of or in addition to the sealing member. This allows a user to fluidly connect any number of adaptors in any orientation desired. In one embodiment, the connector may be a tube or pipe formed from any stainless steel material such as 316L vacuum induction melting or vacuum arc re-melting stainless steel. In another embodiment, the connector may be a T-connector to allow for a horizontal and vertical flow of gasses. Use of the T-connector may allow a user to test the gasses as discussed herein with reference to the test port. The sealing member and/or connector may be welded to the adaptor to prevent any fluid leaks from the conduit.

A test port may be used at 608. A test port may be used to ensure proper gasses are flowing through the gas delivery system such as, to check moisture levels, conduct leak tests of the facility lines, be used as an additional purge valve, and the like. Alternatively, the test port may be used as an additional gas delivery component. The test port may be attached to the adaptor at 610. The test port may be small enough to be positioned between the gas delivery components. The test port may be attached to the horizontal and/or vertical conduits to be in fluid communication with at least one of the plurality of horizontal and/or vertical conduits. To ensure a sealed connection, the test port may be welded to the adaptor.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A flexible gas delivery apparatus, comprising:
    at least one gas stick having a plurality of gas delivery components thereon;
    a plurality of universal fluid flow adaptors interconnected to form a substrate, each of the plurality of universal fluid flow adaptors coupled to and in fluid communication with one of the plurality of gas delivery components;
    wherein each of the plurality of universal fluid flow adaptors is a single structure comprising:
        a plurality of vertical conduits to receive a gas flow, the plurality of vertical conduits extending through the single structure from a top surface to a bottom surface;
        a plurality of horizontal conduits to receive a gas flow, the plurality of horizontal conduits extending through a first side, a second side, a first end, and a second end at an interior of the single structure, wherein the plurality of horizontal conduits form a mixing manifold, the mixing manifold in fluid communication with a plurality of mixing valves;
        wherein one or more of the plurality of vertical conduits converge with at least one of the plurality of horizontal conduits at the interior of the single structure, and
        wherein one or more of the plurality of horizontal conduits converge to form at least one cross-shaped conduit at the interior of the single structure.

2. The apparatus of claim 1, further comprising a base plate having an upper surface and a lower surface, the upper surface of the base plate coupled to a bottom surface of the substrate.

3. The apparatus of claim 1, wherein the plurality of horizontal conduits form a purge/pump manifold, the pump/purge manifold in fluid communication with a plurality of pump/purge valves.

4. The apparatus of claim 3, wherein the pump/purge manifold is substantially parallel to the mixing manifold.

5. The apparatus of claim 1, further comprising at least one sealing member designed to securely seal at least one of the plurality of horizontal conduits or at least one of the plurality of vertical conduits.

6. The apparatus of claim 1, further comprising at least one connector designed to receive a gas flow, the at least one connector coupled to the at least one of the plurality of horizontal conduits or the at least one of the plurality of vertical conduits.

7. The apparatus of claim 1, further comprising a test port extending outwardly from the adaptor, wherein the test port is in fluid communication with at least one of the plurality of vertical conduits or at least one of the plurality of horizontal conduits.

* * * * *